United States Patent [19]

Hill, Jr. et al.

[11] Patent Number: 4,522,867
[45] Date of Patent: Jun. 11, 1985

[54] BIAXIALLY ORIENTED POLYAMIDE FILM

[75] Inventors: H. Wayne Hill, Jr.; Jerry O. Reed, both of Bartlesville, Okla.

[73] Assignee: Phillips Petroleum Company, Bartlesville, Okla.

[21] Appl. No.: 525,752

[22] Filed: Aug. 23, 1983

[51] Int. Cl.$^3$ .................. B32B 27/34; B32B 3/20; B28C 17/02

[52] U.S. Cl. .................. 428/220; 264/176 R; 264/290.2; 428/332; 428/474.4; 528/336; 528/339

[58] Field of Search ............... 528/336, 339; 264/289, 264/95, 176 R, 290.2; 428/474.4, 332, 220

[56] References Cited

U.S. PATENT DOCUMENTS

| | | | |
|---|---|---|---|
| 2,512,606 | 6/1950 | Bolton | 528/336 |
| 3,211,705 | 10/1965 | Gadecki | 528/336 |
| 3,248,463 | 4/1966 | Wiley | 264/95 |
| 3,652,759 | 3/1972 | Schlemmer et al. | 264/289 |
| 3,839,299 | 10/1974 | Campbell et al. | 528/339 |
| 3,840,501 | 10/1974 | Shue et al. | 528/339 |
| 4,028,476 | 6/1977 | Kleinschmidt et al. | 428/220 |
| 4,097,469 | 6/1978 | Shue et al. | 528/336 |
| 4,120,928 | 10/1978 | Furukawa et al. | 264/171 |
| 4,286,018 | 8/1981 | Asakura et al. | 428/332 |
| 4,341,827 | 7/1982 | Austen et al. | 428/474.4 |

*Primary Examiner*—Thomas J. Herbert

[57] ABSTRACT

A biaxially-oriented amorphous polyamide film and the preparation thereof are described. The film exhibits good physical and optical properties. In a specific embodiment, the amorphous polyamide is a product of the polymerization of 2,2-bis(4-aminocyclohexyl)propane with a mixture of adipic acid and azelaic acid. The polymer is extruded as a sheet and biaxially oriented under described conditions to produce a clear film having a high glass transition temperature and improved elongation properties.

19 Claims, No Drawings

BIAXIALLY ORIENTED POLYAMIDE FILM

BACKGROUND OF THE INVENTION

This invention relates to polymeric film. It further relates to articles prepared from amorphous polyamides.

Polymeric films have a wide range of commercial uses, from beverage bottles and transparent packaging for food to strong films for industrial uses such as magnetic tape and insulation material. It is known that crystalline polymeric materials such as polyethylene, polyester, poly(vinyl chloride), polystyrene, and certain polyamides can be biaxially stretched for "orientation" of the polymer molecules. The stretched film is then annealed to heat-set the oriented molecules. The result is generally, for such crystalline linear polymers, a stronger and denser material.

It would be desirable to impart to the sheet products of non-crystalline polymers such as polyamides certain of the advantages of biaxially-oriented crystalline polymeric films.

It is therefore an object of the invention to produce an improved amorphous polyamide film.

SUMMARY OF THE INVENTION

According to the invention, there is provided a biaxially stretched amorphous polyamide film or sheet. The amorphous polyamide can contain alicyclic units and is preferably the reaction product of a condensation polymerization of at least one dicarboxylic acid and at least one alicyclic diamine. The film can be produced by extruding a sheet of an amorphous polyamide material, heating the extruded sheet at a temperature above the glass transition temperature, stretching the sheet at a draw ratio of at least about 1.5, and, optionally, heat-setting the stretched sheet. The biaxially stretched amorphous polyamide film is generally characterized by a thickness of about 0.01 mm to about 0.50 mm and a density of about 1.0 to about 1.2 g/cc, and has good optical properties for uses requiring a transparent film.

DETAILED DESCRIPTION OF THE INVENTION

The invention film can be produced from an essentially amorphous polyamide resin. By "amorphous" is meant that the polymer does not exhibit a distinct melting temperature and crystallization temperature as are characteristic of crystalline polymeric materials. By "polyamide" is meant a solid material having repeating structural units which contain at least one —C(O)NH— group.

The polyamides which are suitable for the film of the invention include alicyclic polyamides containing repeating structural units which contain at least one alicyclic moiety. Such polymers can be produced by copolymerizing monomers of at least one dicarboxylic acid and at least one alicyclic diamine.

A particularly suitable amorphous polyamide can be produced by the condensation polymerization of at least one $C_6$–$C_{12}$ straight-chain alkane dicarboxylic acid with an alicyclic diamine. Such dicarboxylic acids include adipic, suberic, azelaic, sebacic, and dodecanedioic. Suitable alicyclic diamines include 2,2-bis(4-aminocyclohexyl)propane (PACP) or methyl derivatives thereof, which can be represented by the formula

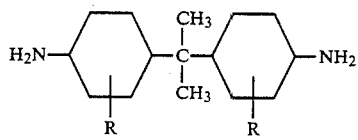

wherein each R is selected from hydrogen and methyl radicals. Geometric isomers and mixtures of the diamines can be used. An amorphous terpolymer can be prepared by contacting, under polymerization conditions, the diamines with the diacids. In a preferred polymerization, 2,2-bis(4-aminocyclohexyl)propane or methyl derivatives thereof are contacted with a mixture of adipic acid and a higher molecular weight straight-chain dicarboxylic acid. Preferably, the mixture of acids contains about 20 to about 65 mole percent adipic acid and about 35 to about 80 mole percent of at least one higher, straight-chain dicarboxylic acid selected from suberic, azelaic, sebacic and dodecanedioic acids. The PACP or methyl derivative thereof is preferably employed in a molar ratio of about 1 mole per mole of the acid mixture, but the reaction can be carried out in systems having a slight excess up to about 5 mole percent of the acids or diamine.

The polyamides used in the invention film can be prepared by a melt polymerization process such as that described in U.S. Pat. No. 3,840,501. They can also be prepared by a two step process in which a prepolymer is prepared, the prepolymer is extruded, and the extruded prepolymer is again subjected to polymerization conditions to produce the desired polyamide, as described in U.S. Pat. No. 4,097,469.

Suitable PACP 9/6 resin for producing an amorphous biaxially-oriented film has an inherent viscosity in the range of about 0.8 to about 2.0 dl/g in m-cresol at 30° C. It has a glass transition temperature in the range of about 150° C. to about 200° C. and has essentially no DSC (differential scanning calorimetry; 20° C./min in nitrogen) melting point. The density of the starting resin will be in the range of about 1.0 g/cc to about 1.2 g/cc.

For production of biaxially-oriented film, the chosen polymer resin is first extruded into film or sheet at a temperature of about 250° C. to about 350° C. under an inert atmosphere such as nitrogen gas to minimize oxidation and discoloration of the polymer. For optimum clarity and light transmission, impurities, polymer gel and die streaks should be minimized.

Biaxial orientation of the polyamide can be carried out by any biaxial orientation process. Generally, orientation will be carried out above the glass transition temperature (Tg) of the polymer, preferably from about 5° C. to about 20° C. above the Tg. For example, for PACP 9/6 (60/40) copolyamide having a sheet Tg of about 174° C., the preferred biaxial orientation temperature is from about 184° C. to about 190° C. to obtain film having the most desired physical properties and appearance.

The extruded sheet or film is then subjected to biaxial stretching, which may be carried out on the extruded sheet or film prior to cooling or after cooling and reheating to the stretching temperature.

Methods of biaxial orientation include tentering and bubble-blowing. Tentering, which has been used extensively in the textile industry, consists of stretching a formed flat sheet first in the machine direction under heat and pressure, such as over heated rolls or through an oven between rolls, and then in the transverse direction with a tenter-frame at an elevated temperature.

In bubble-blowing orientation, the film can be stretched in the machine and transverse directions simultaneously.

The biaxially-oriented film can optionally be subjected to a post-orienting heat treatment for annealing (heat-setting) the polymer; however, an advantage of biaxial orientation of the amorphous polymers is that annealing is not necessary to preserve the properties imparted by orientation. Annealing is generally carried out by exposing the biaxially-oriented sheet or film to a temperature within the range of about 100° C. to about 225° C., preferably about 125° C. to about 200° C., generally for about 10 seconds to several minutes.

In a typical process, PACP 9/6 pellets, from which the moisture has been removed by pre-drying or by using a vented extruder, are heated in an extruder to a temperature sufficiently high to produce a suitable extrusion viscosity but not so high as to degrade the polymer, preferably about 250° C. to about 350° C. The polymer is extruded into a film or sheet, usually a sheet at least about 10 mils thick. The hot sheet is passed over cooling rolls and, in a continuous process, cooled slightly to the biaxial orientation temperature or, in a noncontinuous process, cooled to ambient and rolled for later orientation. The sheet is then stretched, generally in one direction at a time, at a temperature above the glass transition temperature, generally about 5° C. to about 20° C. above the glass transition temperature of the extruded sheet or the polymer. The stretched sheet is then stretched at roughly a 90° angle to the first stretching direction, at a temperature as described above. The stretching is generally carried out at a draw ratio of about 1.5 to about 3.0 times, based on the extruded dimensions, preferably about 2.2 to about 2.75. The biaxial stretching will generally have the effect of producing a film having a thickness of less than about 12 mils, generally about 1 mil to about 10 mils thick. Suitable biaxial stretching can be accomplished using a combination of rolls for the initial stretching and a tenter frame for the second stretching.

The physical properties of the invention biaxially-oriented polyamide film will vary depending upon its starting monomers and preparation method. A PACP 9/6 (60/40) polymeric film will generally have the following properties: The film will range in thickness from about 0.02 mm (0.8 mil) to about 0.3 mm (12 mil). The tensile strength will most suitably be greater than about 100 MPa, and will generally range from about 75 MPa to about 200 MPa. Its elongation values will generally range from about 10 percent to about 60 percent. Haze of a sample will generally fall within the range of about 1.0 to about 3.0. An optical brightener can be added to the polymer if an essentially clear, non-tinted film is desired. Light transmittance will generally be about 88 to about 93 percent. The glass transition temperature (Tg) determined by DSC is about 174° C. to about 185° C. Density will generally be at least about 1.0 g/cc, and will usually fall within the range of about 1.04 to about 1.08 g/cc.

The polyamide films of the invention are formed from essentially amorphous polymeric material. By "amorphous" is meant that the polymers have no melting point (Tm) as determined by DTA (differential thermal analysis) and DSC. It is noted that the polymers used in the invention film are inherently amorphous, and are not amorphous merely under certain imposed conditions, such as low temperature. They are thus distinguishable from inherently crystalline polymers, including some polyamides, in which crystalline character can be induced under, for example, elevated temperature. When samples of PACP 9/6 film are annealed following orientation, very little density change occurs, indicating that crystallization does not take place.

The amorphous polyamide film of the invention offers the good combination of film properties of clarity (low haze), high glass transition temperature and good chemical resistance. The glass transition temperature for PACP 9/6 of about 170° C.–190° C. is relatively high compared with that for many conventional film materials. This permits the retention of properties at temperatures approaching 185° C., making it suitable for high-temperature film applications such as adhesive tape for electrical applications. The haze of a sample of PACP 9/6 film about 2 mil in thickness is about 1.3 percent, making it highly suitable for imaging applications requiring a transparent, non-distortive film, such as printing plates.

As can be seen from the data in the examples, the biaxial orientation of the amorphous polyamide results in better clarity (lower haze), greater strength and better elongation properties. Contrary to what is generally seen for crystalline materials, the density of the PACP 9/6 does not change appreciably with annealing.

As used herein, the term "biaxial orientation" refers to stretching of a sheet of the polyamide in at least two different directions. The draw ratio of the biaxial orientation can be any draw ratio effective to achieve the desired properties or appearance of the film. Generally, the draw ratio (extended length divided by original length) will be within the range of from about 2 to about 3 in each direction.

The process of biaxial orientation of the amorphous polyamide has the effect generally of increasing tensile strength and decreasing elongation and Elmendorf tear. A biaxially-oriented PACP 9/6 film is essentially colorless and has low haze and good surface gloss.

EXAMPLE I

This example describes the procedure used to make the polyamide polymer and the film described herein. The polyamide polymer was produced by a 2-step process similar to that described in U.S. Pat. No. 3,840,501 and prepared from a 50:50 mole ratio of 2,2-bis(4-aminocyclohexyl)propane (PACP) and a 60/40 mole ratio mixture of azelaic acid and adipic acid (9/6).

The preparation of PACP 9/6 was as follows: To a 30-gallon 316 stainless steel autoclave fitted with a variable speed drive anchor stirrer, heat exchanger, thermocouple and a hot oil heat source through a spiral wound jacket fitted to the outside of the vessel was charged 33.1 pounds (0.14 pound moles) of PACP, 15.7 pounds (0.08 pound moles) of azelaic acid, 8.1 pounds (0.06 pound moles) of adipic acid, 14.2 pounds of distilled water, 1.67 grams of an optical brightener (Estorite OB-1, available from Eastman Chem. Co.), 2.57 grams of manganous hypophosphite (from ICN-K and K Laboratories, Inc.) and 15 grams of acetic acid. The reactor was closed and pressurized to 20 psi with nitrogen.

The reactor contents were stirred and heated to 290° C. As the temperature increased, the reactor pressure increased to 150 psi. Water was vented from the reactor to maintain 150 psi until a temperature of 290° C. was reached. This took about 4.5 hours. The reactor was then vented to 0 psi in 30 minutes. With the stirrer, off the reactor was pressured to 125 psi with nitrogen. The product was then extruded through a Strahman valve, stranded into a water bath for cooling, and pelletized. The pelletized prepolymer was dried for 8 hours in an oven at 100° C. The prepolymer was finished by passage through a 1 inch diameter NRM bench model extruder heated to 325° C. (die plate heated to 310° C.) and metered into a Baker Perkins twin screw single stage Poly-Con 100 fitted with a vacuum chamber, heating jacket, variable speed drive and die plate. The temperature of the Poly-Con was about 310° C. and the screw speed was about 32 rpm. The polyamide was cooled in a water trough, passed through a chopper and pelletized. The product had an inherent viscosity of 1.1 measured in m-cresol solvent at a concentration of 0.50 grams/100 milliliters at 30° C. The pellets were dried in a vacuum oven at about 100° C. for 1–2 days.

Film extrusion (16 mil thick X 6 inches wide) was carried out on a 1.25 inch diameter extruder equipped with a 6-inch wide flex-lip die and a sheet line. The conditions for making 16-mil sheet were extruder zone 1, 540° F.; zone 2, 599° F.; zone 3, 599° F.; adaptor, 599° F.; die, 599° F.; rolls, 210°–220° F.; screw 55 rpm. Lighter films (3 mil and 10 mil) were also made. The film thus prepared had the properties set out in Table I.

TABLE I

PACP 9/6 Properties

| Properties | Nominal Thickness | | |
|---|---|---|---|
| | 3 mil | 10 mil | 16 mil |
| Density, g/cc | — | — | 1.054 |
| Thickness, mm (mil) | 0.078 (3.1) | 0.026 (10.1) | 0.042 (16.7) |
| Tensile Yield, MPa, MD/TD | 63/54 | 81/74 | 80/59 |
| Tensile Strength, MPa, MD/TD | 57/55 | 66/61 | 85/63 |
| Elongation, %, MD/TD | 82/46 | 73/47 | 43/44 |
| Elmendorf, g, MD/TD | 30/28 | 429/406 | 1050/1104 |
| Haze, % | 1.9 | 4.1 | 3.8 |
| Transmittance, % | 92.8 | 92.4 | 91.8 |
| DSC Tg, °C. | — | — | 174 |

EXAMPLE II

This example describes the process by which polyamide copolymer films prepared in accordance with the procedure described in Example I were biaxially oriented and compares the properties of non-oriented and biaxially-oriented films of similar thickness. The sheet (about 16 mils thick) was placed in a T. M. Long Film Stretcher Unit (T. M. Long Co.) at 365°–370° F. (185°–188° C.) and was biaxially oriented simultaneously in both directions at a rate of 1000 percent per minute after preheating for 10 to 150 seconds. The PACP 9/6 film was biaxially oriented at draw ratios between 2X and 2.75X in both directions, draw ratio being defined as the extended length divided by the original length. The drawn film was removed from the film stretcher and was evaluated for various properties. In this manner, the aforementioned polyamide copolymers were evaluated. These results are listed in Table II along with those of a non-oriented extruded PACP 9/6 film of a similar thickness. Biaxial orientation causes significant increases (relative to non-oriented PACP 9/6 film) in the tensile strength and decreases in elongation and Elmendorf tear. The biaxially oriented PACP 9/6 film is colorless and has low (below about 1.5 percent) haze and good surface gloss.

Samples of the biaxially oriented PACP 9/6 film were annealed at temperatures between 150° and 225° C. for 90 seconds in a forced air oven with each sample held at constant length in a frame. The densities of the annealed films ranged from 1.060 (150° C. sample) to 1.064 (225° C. sample). The lack of increase in density from annealing indicates that the film does not crystallize.

TABLE II

| Performance Properties | Biaxially Oriented (BO) Film | |
|---|---|---|
| | PACP 9/6 | BO PACP 9/6 |
| Draw Ratio | — | 2.75 X |
| Thickness, mm (mil) | 0.078 (3.1) | 0.055 (2.2) |
| Density, g/cc | 1.054[a] | 1.064 |
| Tensile Yield, MPa, MD/TD | 63/54 | 76/78 |
| Tensile Strength, MPa, MD/TD | 57/55 | 108/103 |
| % Elongation, MD/TD | 82/46 | 24/23 |
| Elmendorf, g, MD/TD | 30/28 | 8.8/8.4 |
| Elmendorf, g, mil, MD/TD | 13/12 | 4/3.8 |
| Haze[b], % | 1.9 | 1.3 |
| Shrinkage[c], % | — | 2 |
| Transmittance, % | 92.8 | 92 |
| Tg[d] | — | 184° C. |

[a]Density is of the 16 mil sheet carried out in a density gradient column.
[b]Haze determined on a Hunter-Lab D55H Hazemeter.
[c]Film held freely in a vertical position with slight weight. Shrinkage estimated by measuring film before and after exposure at 150° C. for 10 minutes.

That which is claimed is:

1. An amorphous biaxially-stretched film having a thickness in the range of about 0.02 mm to about 0.3 mm formed from an essentially amorphous polyamide which is the product of the condensation polymerization of 2,2-bis(4-aminocyclohexyl)propane with a mixture of adipic acid and azelaic acid.

2. The film of claim 2 which is the product of biaxial orientation of an extruded sheet of an amorphous polyamide at a temperature within the range of from about 5° C. to about 20° C. above the glass transition temperature of the polyamide.

3. The film of claim 1 in which the polyamide is a product of the condensation polymerization of 2,2-bis(4-aminocyclohexyl)propane with said mixture further containing at least one of suberic, sebacic and dodecanedioic acids.

4. The film of claim 1 in which the adipic acid and azelaic acid are present in the mixture in a mole ratio of about 40:60.

5. The film of claim 1 in which the mole ratio of the PACP to the mixture of adipic acid and azelaic acid is about 1:1.

6. The film of claim 1 in which the polyamide has an intrinsic viscosity in the range of from about 0.8 to about 2.0.

7. The film of claim 2 which is the product of biaxial orientation of an extruded sheet of an amorphous polyamide at a temperature within the range of about 184° C. to about 190° C. and a draw ratio of at least about 1.5.

8. The film of claim 1 characterized by the following properties: a glass transition temperature in the range of about 174° C. to about 185° C., a density of about 1.04 to about 1.08 g/cc, light transmittance of about 90 to about 92 percent, haze of below about 1.5 percent, and tensile strength of at least about 100 MPa.

9. The film of claim 1 which has been stretched in two directions at a draw ratio of at least about 1.5 times in each direction.

10. The film of claim 9 having a density (in film form) of at least about 1.0 g/cc.

11. The film of claim 9 which has been annealed at a temperature in the range of about 100° C. to about 225° C. subsequent to biaxial stretching.

12. An article comprising the biaxially oriented film of claim 1.

13. An amorphous biaxially-stretched film having a thickness in the range of about 0.02 mm to about 0.3 mm consisting essentially of an essentially amorphous polyamide which is the product of the condensation polymerization of 2,2-bis(4-aminocyclohexyl)propane with a mixture of adipic acid and azelaic acid.

14. A process for preparing an amorphous film having a glass transition temperature of from about 174° C. to about 185° C., a haze value of below about 1.5 percent and a tensile strength of at least about 100 MPa, the process comprising extruding an amorphous polyamide which is the product of the condensation polymerization of adipic acid, azelaic acid and 2,2-bis(4-aminocyclohexyl)propane into a sheet; and biaxially orienting the extruded sheet at a temperature in the range of about 5° C. to about 20° C. above the sheet glass transition temperature of the polyamide and at a draw ratio of at least about 1.5 in each direction.

15. The process of claim 14 which further comprises annealing the biaxially-oriented sheet at a temperature in the range of about 100° C. to about 225° C. for a time of at least about 10 seconds.

16. The process of claim 14 in which the amorphous polyamide is extruded at a temperature in the range of about 250° C. to about 350° C.

17. The process of claim 16 in which the biaxial orientation is carried out at a draw ratio in each direction in the range of about 1.5 to about 3.0, based on the extruded dimensions of the sheet.

18. The process of claim 16 in which the extruded sheet is biaxially oriented at a temperature in the range of about 184° C. to about 190° C.

19. The process of claim 18 in which the amorphous polyamide is a product of the condensation polymerization of 2,2-bis(4-aminocyclohexyl)propane with a mixture of adipic acid and azelaic acid and at least one of an acid selected from suberic, sebacic and dodecanedioic acids.

* * * * *

UNITED STATES PATENT AND TRADEMARK OFFICE
CERTIFICATE OF CORRECTION

PATENT NO. : 4,522,867

DATED : June 11, 1985

INVENTOR(S) : H. Wayne Hill, Jr.; Jerry O. Reed

It is certified that error appears in the above-identified patent and that said Letters Patent is hereby corrected as shown below:

Claim 2, line 1, delete "2" and insert --- 1 ---.

Claim 7, line 1, delete "2" and insert --- 1 ---.

Signed and Sealed this

Nineteenth Day of November 1985

[SEAL]

Attest:

DONALD J. QUIGG

Attesting Officer

Commissioner of Patents and Trademarks